United States Patent
Mizuno

(10) Patent No.: US 6,201,573 B1
(45) Date of Patent: Mar. 13, 2001

(54) SOLID STATE IMAGING APPARATUS FOR IMAGING A TWO DIMENSIONAL OPTICAL IMAGE HAVING A NUMBER OF INTEGRATION CIRCUITS

(75) Inventor: Seiichiro Mizuno, Hamamatsu (JP)

(73) Assignee: Hamamatsu Photonics K. K., Hamamatsu (JP)

( * ) Notice: Subject to any disclaimer, the term of this patent is extended or adjusted under 35 U.S.C. 154(b) by 0 days.

(21) Appl. No.: 08/757,423

(22) Filed: Nov. 27, 1996

(51) Int. Cl.⁷ ............................................. H04N 3/14
(52) U.S. Cl. .................... 348/308; 348/310; 348/315; 250/208.1
(58) Field of Search ................. 250/208.1; 348/294, 348/300, 301, 302, 303, 304, 307–311, 315, 316, 317, 319–323; H04N 3/14

(56) References Cited

U.S. PATENT DOCUMENTS

| | | | |
|---|---|---|---|
| 4,734,589 | 3/1988 | Atherton | 250/578 |
| 5,155,348 | * 10/1992 | Ballingal | 250/208.1 |
| 5,436,442 | * 7/1995 | Michon | 250/208.1 |
| 5,563,405 | * 10/1996 | Woolaway | 250/208.1 |
| 5,608,205 | * 3/1997 | Bird | 348/311 |
| 5,668,375 | * 9/1997 | Petrick | 250/208.1 |
| 5,726,439 | * 3/1998 | Miyawaki | 348/302 |
| 5,731,578 | * 3/1998 | Mizuno | 348/308 |

FOREIGN PATENT DOCUMENTS 4-3588   1/1992   (JP) .............................. H04N/5/335

OTHER PUBLICATIONS

Herrmann et al, "A 256–Element Associative Parallel Processor", IEEE Journal of Solid–State Circuits, vol. 30, No. 4, Apr. 1995, pp. 365–370.
IVP, Product Information MAPP2200 (No date).

* cited by examiner

Primary Examiner—Wendy Garber
Assistant Examiner—Ngoc-Yen Vu
(74) Attorney, Agent, or Firm—Pillsbury Madison & Sutro LLP

(57) ABSTRACT

In a solid-state imaging apparatus of the present invention, after an integration operation is started with an integration circuit by setting a reset instruction signal at logical zero, charges stored in a light receiving device are discharged by selecting this light receiving device. A value of an integration signal obtained by an integration operation of an integration circuit is compared with a reference value by a comparing circuit. A capacitance control section informs a capacitance instruction signal to a variable capacitor section of the integration circuit in response to a comparing result. A feedback loop is formed, which consists of the integration circuit, the comparing circuit, and a capacitance control circuit. When the value of the integration signal agrees finally with the reference value within resolution, the capacitance control section outputs a value in accordance with the capacitance instruction signal. This value is sequentially read out through a horizontal reading-out section.

11 Claims, 6 Drawing Sheets

SOLID STATE IMAGING APPARATUS FOR IMAGING A TWO DIMENSIONAL OPTICAL IMAGE HAVING A NUMBER OF INTEGRATION CIRCUITS

BACKGROUND OF THE INVENTION

1. Field of the Invention

The present invention relates to a solid-state imaging apparatus for imaging a two-dimensional optical image input thereto.

2. Related Background Art

The imaging apparatus employing a solid-state image sensor represented by a charge coupled device ( hereinafter referred to as a CCD ) has been used in various kinds of fields including household videos. However, the CCD has a low charge transfer efficiency. When charges stored in photo diodes occupying comparatively a large light receiving area are handled to be transferred, they are not transferred completely. For such reason, in the specified field, among the solid-state imaging apparatuses, MOS type image sensors have been preferably employed which produce no problem on the charge transfer efficiency.

Among the MOS type image sensors, the ones for imaging two-dimensional optical images have heretofore adopted the system wherein a single discrete amplifier is provided for a photo diode array having a plurality of two-dimensionally arranged photo diodes, a light detection signal is fetched from each photo diode after it has been amplified by the amplifier. Recent years, the proposals to mount both of a reading-out circuit and a light detection circuit on the same chip and to modify a system of circuit structure have been made, in order to increase an S/N ratio for the light detection signal and to miniaturize the apparatus while utilizing the merits of the MOS image sensors.

Such representative example of the proposals is the solid-state imaging apparatus disclosed in Japanese Patent Application Laid Open Heisei 4-3588. FIG. 1 is a circuit diagram of this solid-state imaging apparatus. As shown in FIG. 1, the apparatus comprises (a) a light receiving unit 930 consisting of an N2 number of vertical light receiving sections 920 arranged in a horizontal direction, each of which is connected to common output lines and is provided with an N1 number of light receiving devices 910 arranged in a vertical direction, each of light receiving devices being composed of a photoelectric conversion element 912 and a switching element 912; (b) integration circuits 940, each being arranged for corresponding one of the vertical light receiving sections 920 to integrate the output therefrom and having a charge amplifier 941; (c) sample-and-hold circuits 950, each sampling/holding the signal from corresponding one of the integration circuits 940; (d) switching circuit 960, each controlling the output/non-output of the signal from corresponding one of the sample-and-hold circuits 950 to the outside; (e) a vertical shift-register 971 for instructing to determine the light receiving device 910 to read out the light detection result for the vertical direction; and (f) a horizontal shift-register 972 for instructing to determine the light receiving device 910 to read out the light detection result for the horizontal direction.

With such constitution, a light detection signal in accordance with a light intensity detected by each light receiving device is output through a video signal wiring 980, and the impedance conversion is conducted by buffer circuits 990.

SUMMARY OF THE INVENTION

The object of the present invention is to provide a solid-state imaging apparatus which is capable of imaging images with a high SN ratio (S/N).

A solid-state imaging apparatus of a first aspect of the present invention which images up a two-dimensional optical image comprises, (a) a light receiving unit composed of a first number of vertical light receiving sections arranged along a first direction, each of which consists of a second number of light receiving devices arranged in a second direction, each light receiving device is composed of a photoelectric conversion element for converting an input optical signal to a current signal and a switching element having a first terminal connected to a signal output terminal of said photoelectric conversion element and a second terminal to provide charges generated by the photoelectric conversion element in response to a vertical scanning signal, each of said vertical light receiving sections having a signal output terminal electrically connected to the second terminal of said switching element; (b) a first number of integration circuits for receiving individually the output signal from the corresponding vertical light receiving section, each of which enables, in response to a reset instruction signal, a variable capacitor section either to perform an integration for the current signal output from corresponding one of said vertical light receiving section or not to perform the integration for the current signal, the variable capacitor section being connected between input and output terminals of a current amplifier and varying a capacitance value in response to a capacitance instruction signal; (c) the first number of comparing circuits for comparing an integration signal output from each integration circuit with a reference value to output a comparing result; (d) the first number of capacitance control sections which receive a comparing result signal from each comparing circuit to output a capacitance instruction signal for informing to a variable capacitance in accordance with a value of the comparing result signal, and which outputs a first digital signal in response to the capacitance instruction signal when it is judged, from the comparing result signal, that a value of the integration signal agrees with the reference value at a predetermined resolution; and (e) the first number of horizontal reading-out sections, each receiving the first digital signal from corresponding one of the capacitance control sections, and outputting a second digital signal in response to a horizontal scanning signal.

Here, it is preferable that the values of the first and second digital signals should equal each other for simplicity of the circuit constitution.

Furthermore, the horizontal reading-out section may be further provided with a data conversion section for receiving the first digital signal output from the capacitance control section and for outputting the second digital signal by data conversion. Here, the data conversion can be applied to the offset cancel. Moreover, the data conversion section may be provided with a read-only memory device which receives the first digital signal in its address input terminal, performs data conversion based on data written to its memory section, and outputs the second digital signal from a data output terminal.

A solid-state imaging apparatus of a second aspect of the present invention which images up a two-dimensional optical image comprises, (a) a light receiving unit composed of a first number of vertical light receiving sections arranged along a first direction, each of which consists of light receiving devices arranged in a second direction, each light receiving device is composed of a photoelectric conversion element for converting a input optical signal to a current signal and a switching element having a first terminal connected to a signal output terminal of the photoelectric conversion element and a second terminal to provide charges generated by the photoelectric conversion element in response to a vertical scanning signal, each of said vertical light receiving sections having a signal output terminal electrically connected to the second terminal of said switching element; (b) a first number of integration circuits for receiving individually the output signal from the corresponding vertical light receiving section, each of which integration circuits enables, in response to a reset instruction signal, a variable capacitor section either to perform an integration for the current signal output from each vertical light receiving section or not to perform the integration for the current signal, the variable capacitor section being connected between input and output terminals of a charge amplifier and varying a capacitance value in response to a capacitance instruction signal; (c) the first number of comparing circuits, each of which compares the value of the integration signal from corresponding one of the integration circuits with the reference value every time when a capacitance value of the variable capacitance of corresponding one of the integration circuits varies, and outputs a comparing result as a first serial digital data; (d) the first number of capacitance control sections, each of which receives a comparing result signal from corresponding one of the comparing circuits, and outputs a capacitance instruction signal for instructing the variable capacitor section, according to the value of the comparing result signal; (e) the first number of first-in-last-out (FILO) register, each of which sequentially receives a first serial digital data from corresponding one of the comparing circuits, and outputs a second serial digital data in an reverse order to the inputting order; (f) the first number of processing units, each of which receives sequentially the second serial digital data from corresponding one of the FILO registers, and outputs a first parallel digital signal after parallel processing; and (g) the first number of the horizontal reading-out sections, each of which receives a signal from corresponding one of the processing units, and outputs it in response to the horizontal scanning signal.

Here, the processing unit may comprise such constitution that it further receives the second serial digital data from a FILO register arranged in an adjacent vertical light receiving section and performs computations for adjacent pixels to output the second parallel digital data to the horizontal reading-out section.

In the solid-state imaging apparatus of the first and second aspects of the present invention, the integration circuit may comprises a charge amplifier for receiving an output signal from the vertical light receiving section and amplifies it to output; and the variable capacitor section may comprise, a third number of capacitance elements; the third number of first switching elements, each of which has a first terminal connected to a first terminal of corresponding one of the capacitance elements and has a second terminal connected to the output terminal of the charge amplifiers, each first switching element opening/closing in response to the capacitance instruction signal; and a third number of second switching elements, each of which has a first terminal connected to a second terminal of corresponding one of the capacitance elements and has a second terminal connected to a reference potential level terminal, each second switching element opening/closing in response to a value of the capacitance instruction signal.

Here, the resolution is equal to $1/2^{(the\ third\ number-1)}$ of the reference value. Each of the third number of the capacitance elements has a capacitance value satisfying the following relationship.

$$C_1 = 2C_2 = \ldots = 2^{N-1}C_N \quad (1)$$

where N denotes third number.

In the solid-state imaging apparatus of the first aspect of the present invention, first, the reset instruction signal R is set to be truth (hereinafter, referred to as logical one), and the vertical scanning signal is set in order that it does not select any light receiving device. At this situation, the reset instruction signal R is set to be false (hereinafter, referred to as logical zero) to make each integration circuit start an integration operation.

The capacitance control section generates the capacitance instruction signal upon receipt the comparing result such that the value of the output signal from the integration circuit becomes approximately equal to the reference value, and informs it to the variable capacitor section of the integration circuit. The variable capacitance section supplied with the capacitance instruction signal varies the capacitance thereof according to the instruction. The value of the integration signal varies according to the capacitance variation in the variable capacitor section, and the integration signal after having varied its capacitance is again input to the comparing circuit. Thus, a feedback loop composed of the integration circuit, the comparing circuit, and the capacitance control section is constituted. Finally, the value of the integration signal agrees with the reference value within the resolution.

Next, the vertical scanning signal is output, which renders only the switching element of the light receiving device of each vertical light receiving section to be ON state, the light receiving device being first selected in the vertical scanning. When the switching element is rendered to be ON state, the charges that have been stored in the photoelectric conversion element by light receiving are output from the light receiving unit as the current signal. Then, the charges flow into the variable capacitor section which is set at the initial capacitance value, and the integration signal as a result of the integration by the integration circuit is input to the comparing circuit. In the comparing circuit, the value of the integration signal is compared with the reference value. The comparing result is input to the capacitor control section as binary one-bit digital signal. On the other hand, the one-bit digital signal is input to the FILO register as the first serial digital data and is stored therein. Here, since the variable capacitor section is connected between the input and output terminals of the charge amplifier, the capacitance value of the variable capacitor section can be set with a high accuracy. Therefore, it will be possible to increase a noise resistance.

The capacitance control section outputs the first digital signal having the value in accordance with the capacitance instruction signal produced when the value of the integration signal agrees with the reference value within the resolution. The first digital signal output from the capacitance control section is input to the horizontal reading-out section, so that the second digital signal in accordance with the first digital signal is sequentially selected alternatively by setting the horizontal scanning signal. Thus, the second digital signal is sequentially read out in accordance with the light receiving device, first selected in the vertical scanning, of each vertical light receiving section.

It should be noted that the vertical scanning signal is set such that it does not select any light receiving device at the time when it is presumed that the photoelectric conversion element of the light receiving device has completed discharging the charges stored therein, the light receiving device being first selected in the vertical scanning.

When the sequential reading-out of the detection signal in response to the charges of the light receiving device, first selected in the vertical scanning, of the vertical light receiving section has completed, the reset instruction signal is rendered to be logical one.

Next, the reset instruction signal is again rendered to be logical zero and the value of the variable capacitor is rendered to be the initial value. Thereafter, the vertical scanning signal is output, which renders only the switching element of the light receiving device, secondly selected in the vertical scanning, of the light receiving section to be ON state. When this switching element is rendered to be ON state, the charges that has been stored in the photoelectric conversion element by light receiving are output from the light receiving section as the current signal.

Afterward, similar to the case of the light receiving device, first selected in the vertical scanning, of the vertical light receiving section, the detection signal in accordance with the charges of the light receiving device, secondly selected in the vertical scanning, of the vertical light receiving section is sequentially read out.

Subsequently, while sequentially designating the light receiving device of each vertical light receiving section, similar to the light receiving device, first selected in the vertical scanning, of each vertical light receiving section, the detection signal in accordance with the charges of the light receiving device of each vertical light receiving section is sequentially read out. Thus, the image data of the optical image input to the light receiving section is collected.

If the horizontal reading-out section directly outputs the first digital signal, the data of the first digital signal will agree with that of the second digital signal. With adoption of such system, the circuit of the horizontal reading-out section can be constituted of only switching elements.

Furthermore, if the horizontal reading-out section further comprises a data conversion section which receives the first digital signal output from the capacitance control section and outputs the second digital signal after data conversion, the second digital signal having an output data value can be obtained by properly processing the data value of the first digital signal. For example, by performing the data conversion in the manner of offset removing, data with a high accuracy from which offset is removed can be obtained. The read-only memory device (ROM) should be preferably used as such data conversion section, which receives the first digital signal at its address input terminal, performs data conversion based on data written to a memory section, and outputs the second digital signal from a data output terminal. As a result, the second digital signal from which the offset value is removed can be obtained.

Furthermore, the integration circuit may comprise a charge amplifier which receives an output signal from the vertical scanning section and amplifies it to output; and the variable capacitor section may comprise the third number of capacitance elements, one terminal of each capacitance element being connected to the input terminal of corresponding one of the charge amplifiers for receiving the output signal from the vertical light receiving device; the third number of first switching elements for opening/closing in accordance with the value of the capacitance instruction signal, one terminal of each first switching element being connected to the other terminal of corresponding one of the capacitance elements and the other terminal thereof being connected to the output terminal of corresponding one of the charge amplifiers; and the third number of second switching elements for opening/closing in accordance with the capacitance instruction signal, one terminal of each of the second switching elements being connected to the other terminal of corresponding one of the capacitance elements and the other terminal thereof being connected to the reference potential level.

In this case, the capacitance control section serves to output the signal to control the opening/closing of the first and second switching elements. Thus, the capacitance control section controls the value of the variable capacitor section by controlling the opening/closing of the first and second switching elements.

The values of the third number of the capacitance elements should preferably satisfy the relationship expressed by the following equation, in order to set the resolution to be equal to $\frac{1}{2}^{(third\ number-1)}$ of the reference value.

$$C_1 = 2C_2 = \ldots 2C^{N-1}C_N \tag{1}$$

where N denotes the third number. With such constitution, when the capacitance control section controls the opening/closing of the first and second switching elements using first the capacitance element having the larger capacitance value and the comparing circuit makes sequentially the comparison of the value of the integration signal with the reference value, it will be possible to determine the accuracy of the resolution $\frac{1}{2}^N$ with the third number of capacitance instructions.

In the solid-state imaging apparatus of the second aspect of the present invention, first, the reset instruction signal is set to be logical one, and the vertical scanning signal is set at a situation such that any light receiving device is not selected for outputting a signal. At this situation, the reset instruction signal R is set at logical zero, so that each integration circuit starts to perform its integration operation.

Next, the vertical scanning signal is output, which renders only the switching element of the light receiving device, first selected in the vertical scanning, of each vertical light receiving section. When the switching element is rendered to be ON state, the charges which have been stored in the photoelectric conversion element by light receiving are output from the light receiving device as the current signal. Then, the charges flows into the variable capacitor section, the capacitance value of which is set at the initial value. The integration signal obtained by integration of the integration circuit is input to the comparing circuit so that the value of the integration signal is compared with the reference value. The comparing result signal is input to the capacitance control section. Here, since the variable capacitor section is connected between the input and output terminals of the charge amplifier, the capacitance value of the variable capacitor section can be set at a sufficient accuracy. It is possible to increase noise resistance for the solid-state imaging apparatus of the present invention.

The capacitance control section generates the capacitance instruction signal such that the value of the output signal from the integration circuit becomes approximately equal to the reference value, and informs it to the variable capacitor section of the integration circuit. The variable capacitor section supplied with the capacitance instruction signal varies its capacitance value according to the instruction. The value of the integration signal varies in response to the capacitance variation of the variable capacitor section, and the integration signal after having varied its value is again input to the comparing circuit. Then, every time when the variable capacitor section varies its capacitance value, the first serial digital data is sequentially input from the comparing circuit to the FILO register to be stored therein.

Thus, the feedback loop composed of the integration circuit, the comparing circuit, and the capacitance control section is constituted, and finally the value of the integration agrees with the reference value within the range of resolution.

In the event that the variable capacitor section consists of the capacitance elements having the mutual relationship expressed by the equation (1), the capacitance value of the variable capacitor section should be sequentially determined in view of contribution/non-contribution of the capacitance having the maximum capacitance value C1 to the synthesized capacitance. In this case, the signal from the most significant bit MSB to the least significant bit LSB is sequentially output from the comparing circuit as the first serial digital data.

When the value of the integration signal agrees with the reference value within the resolution, the processing unit read out the second data signal from the FILO register in the reverse bit order to that of the first serial digital data, and output them as the first parallel data. The first parallel digital signal output from the processing unit is input to the horizontal reading-out section. The second digital signal according to the first digital signal is sequentially and alternatively selected by setting the horizontal scanning signal to be sequentially read out as the detection signal according to the charges in the light receiving device, first selected in the vertical scanning, of each vertical light receiving section.

It should be noted that the vertical scanning signal is set such that any light receiving device is not selected at the time when the charges in the photoelectric conversion element of the light receiving device, first selected in the vertical scanning, are assumed to be discharged completely.

When sequential reading-out of the detection signal according to the charges in the light receiving device, first selected in the vertical scanning, of the vertical light receiving section is completed, the reset instruction signal is rendered to be logic one.

Next, the reset instruction signal is rendered to be logical zero again, and the capacitance value of the variable capacitor section is set to be initial.

Thereafter, the vertical scanning signal is output, which renders only the switching element of the light receiving device, secondly selected in the vertical scanning, of each vertical light receiving section. When the switching element is rendered to be ON state, the charges which have been stored in the photoelectric conversion element by light receiving are output from the light receiving device as the current signal.

Afterward, similar to the case of the light receiving device, first selected in the vertical scanning, of the vertical light receiving section, the detection signal according to the charges of the light receiving device, secondly selected in the vertical scanning, of the vertical light receiving section is sequentially read out.

Subsequently, while sequentially designating the light receiving device of each vertical light receiving section, similar to the case of the light receiving device, first selected in the vertical scanning, of each vertical light receiving section, the detection signal according to the charges in the light receiving device of each vertical light receiving section is sequentially read out, whereby the image data of the optical image input to the light receiving device is collected.

Here, it is possible that the processing unit further receives the second serial digital data from the FILO register corresponding to the adjacent vertical light receiving section, and computes for adjacent pixels, for example, performs contour extraction computation, to output the second parallel digital data to the horizontal reading-out section.

As described above, according to the solid-state imaging apparatus of the present invention, the optical detection signal is output from the horizontal reading-out section after converting the signal to digitized one, with a simplified circuit constitution including the charge amplifier, the voltage dividing contingent to the video signal wiring will not substantially affect on accuracy as in the analog signal. The image data of the optical image input to the receiving device can be collected with a high accuracy.

Furthermore, since digitization of the optical detection signal is conducted before horizontal reading-out operation, an analog-to-digital converter to be externally mounted is unnecessary so that the apparatus will be simplified.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a more complete understanding of the present invention and the advantages thereof, reference is now made to the following description taken in conjunction with the accompanying drawings, in which.

DESCRIPTION OF THE PREFERRED EMBODIMENT

Figure 1:
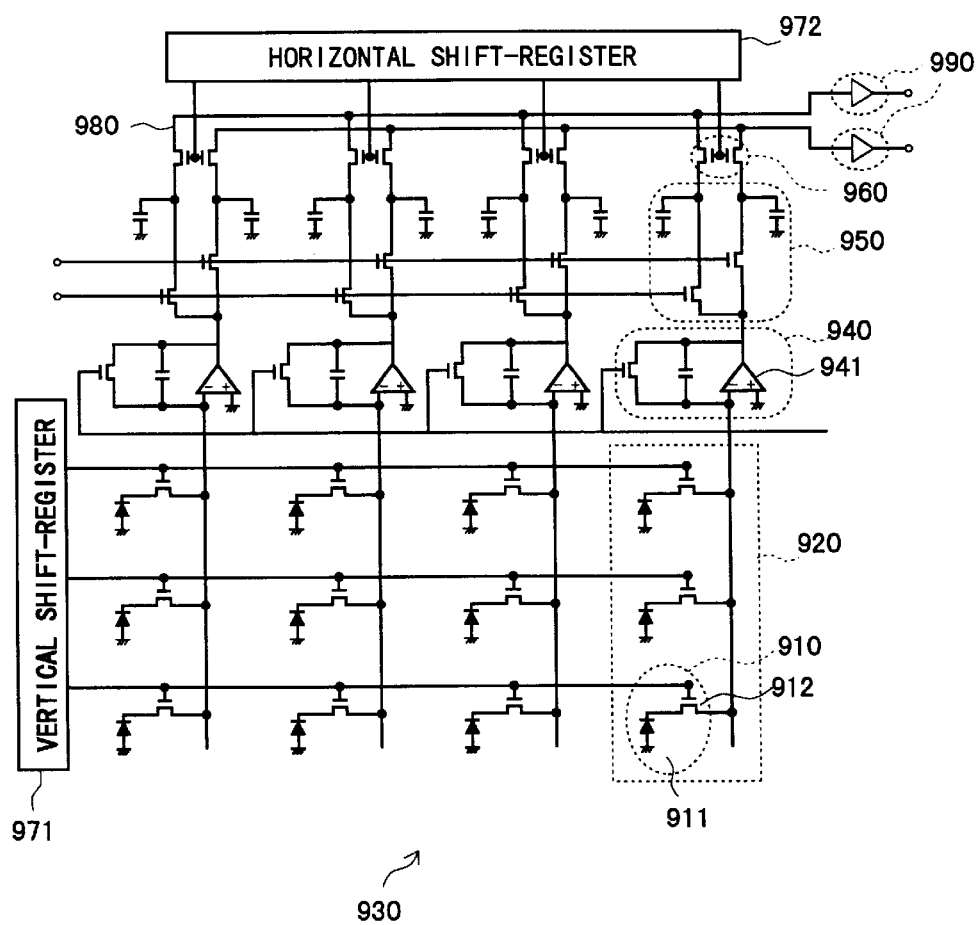
FIG. 1 is a circuit diagram showing a conventional solid-state imaging apparatus.

Embodiments of the solid-state imaging apparatus of the present invention will be described with reference with the accompanying drawings. It should be noted that the same reference numeral are given to the same components in the different embodiments, and the repeated descriptions will be omitted.

(First Embodiment)

Figure 2:
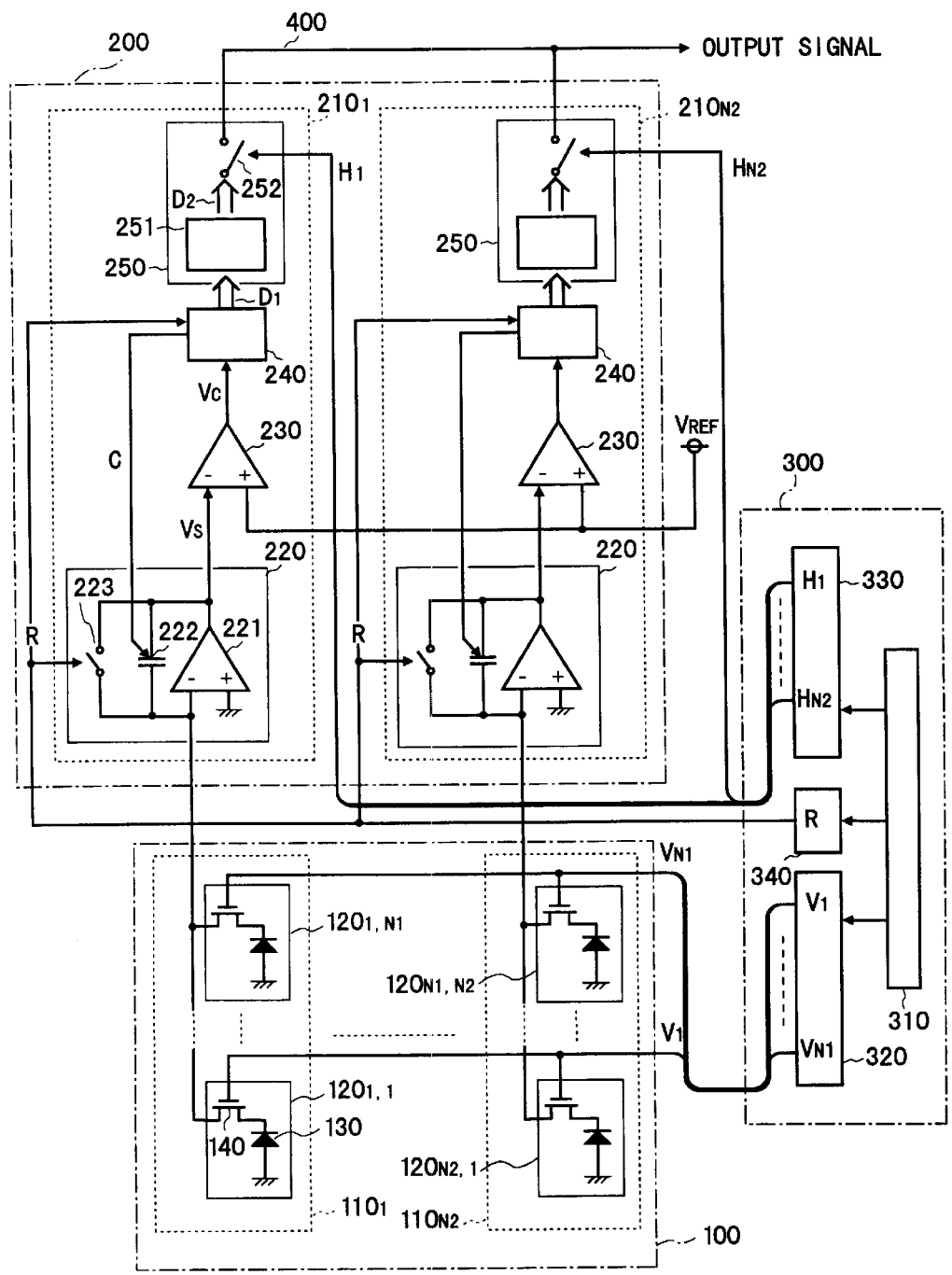
FIG. 2 is a circuit diagram showing a solid-state imaging apparatus of a first embodiment of the present invention.

FIG. 2 is a circuit diagram showing a constitution of a solid-state imaging apparatus of a first embodiment of the present invention. Referring to FIG. 2, the apparatus of the first embodiment comprises (a) a light receiving unit 100 composed of an N2 number of vertical light receiving sections 110 arranged along a first direction (hereinafter referred to as a horizontal direction ), each of which consists of an N1 number of light receiving devices 120 arranged in a second direction (hereinafter referred to as a vertical direction ), each light receiving device being composed of a photoelectric conversion element 130 for converting a input optical signal to a current signal and a switching element 140 connected to the signal output terminal of the photoelectric conversion element 130 to provide the current signal generated by the photoelectric conversion element 130 in response to a vertical scanning signal $V_i$ (i=1 to N1), the signal output terminal of each switching element 140 being electrically connected to one another; (b) a signal processing unit 200 having the N2 number of horizontal signal processing sections $210_j$, each of which receives an output signal from corresponding one of the vertical light receiving sections $110_j$ (j=1 to N2) to output the signal after processing it alternatively in response to a horizontal scanning signal $H_j$; and (c) a timing control unit 300 for informing instruction signals on operation timings to the receiving unit 100 and the signal processing unit 200.

Each of the horizontal signal processing sections $210_j$ comprises (i) a integration circuit 220 which receives the output signal from the vertical light receiving section $110_j$ and performs either to integrate the output signal as a current signal at a variable capacitor section 222 connected between input and output terminals thereof when a reset instruction signal R is in logical zero or to integrate no output signal therein when it is in logical one; (ii) a comparing circuit 230 which compares an integration signal $V_S$ provided from the integration circuit 220 with the reference value $V_{REF}$ to output the comparing result; (iii) a capacitance control section 240 which receives a comparing result signal $V_C$ from the comparing circuit 230 and outputs a capacitance instruction signal C for informing to the variable capacitor section 222 according to the value of the comparing result signal $V_C$, the capacitance control section 240 outputting a digital signal D1 according to the capacitance instruction signal C when it is detected that the value of the integration signal $V_s$ and the reference value $V_{REF}$ are in accord with each other at a predetermined resolution with reference to the comparing result signal $V_C$; and (4) a horizontal reading-out section 250 which receives the digital signal D1 from the capacitance control section 240 to generate a digital signal D2 indicating the data value obtained by removing the previously set offset value from the data value shown by the digital signal D1, and outputs the digital signal D2 according to the horizontal scanning signal $H_j$.

The integration circuit 220 comprises (i) a charge amplifier 221 which receives the output signal from the vertical light receiving section $110_j$ to amplify the charges of the current signal output from the vertical light receiving section $110_j$; (ii) the variable capacitor 222 having one terminal connected to an input terminal of the charge amplifier 221 and the other terminal connected to an output terminal thereof; and (iii) a switching element 223 having a first terminal connected to the input terminal of the charge amplifier 221 and a second terminal connected to the output terminal thereof, which is rendered to be ON state when the reset signal R is in logical one and is rendered to be OFF state when the reset signal R is in logical zero.

Figure 3:
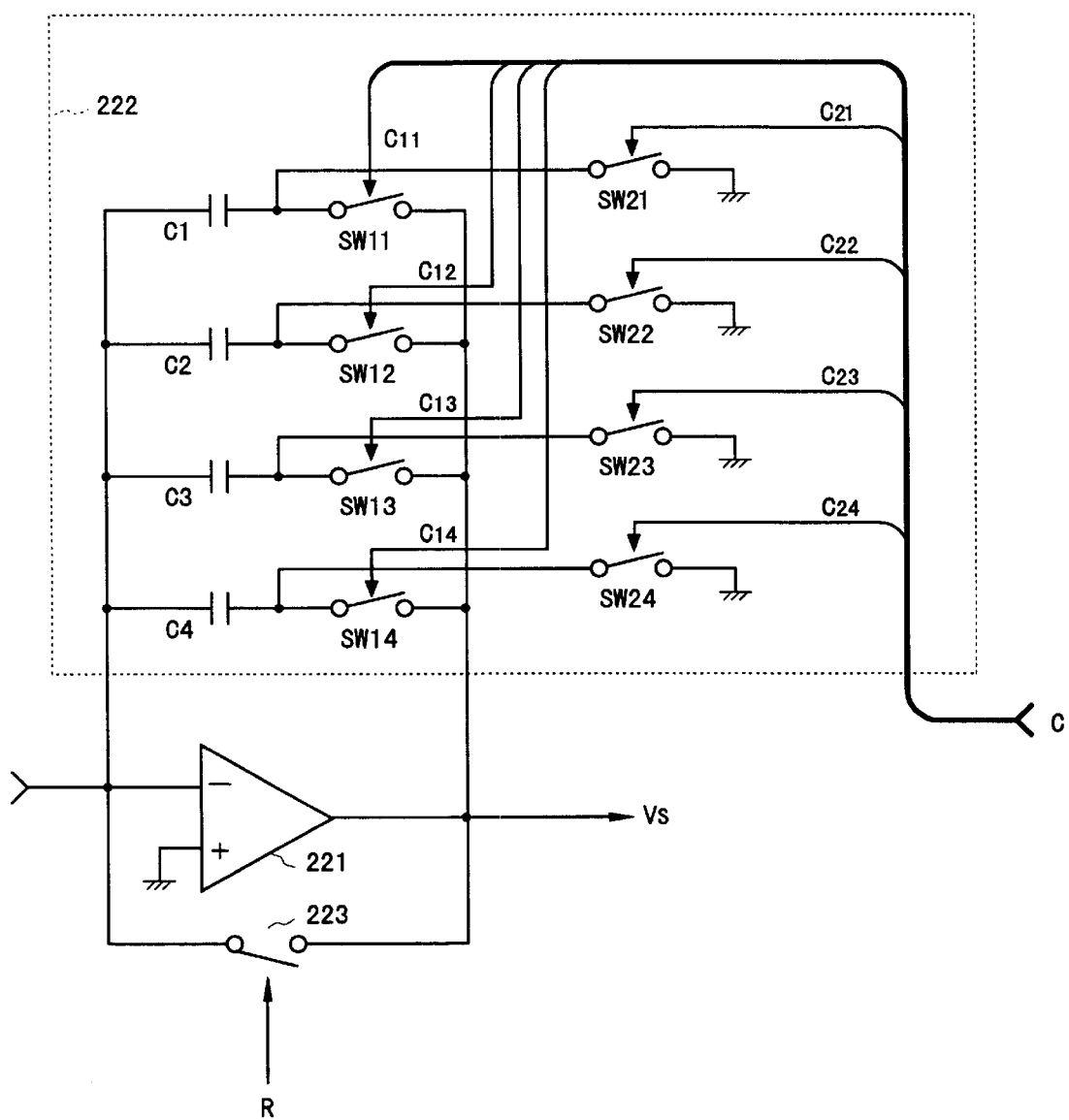
FIG. 3 is a circuit diagram showing an integration circuit of the solid-state imaging apparatus of the first embodiment of the present invention.
Figure 4:
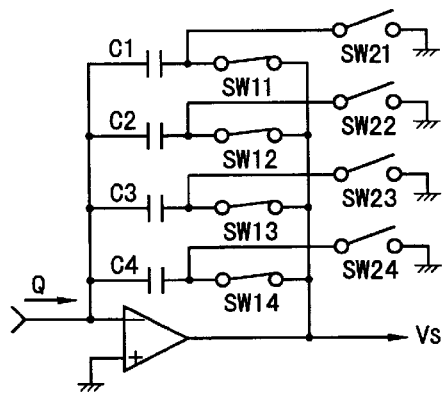
FIGS. 4 to 7 are figures for explaining operations of the solid-state imaging apparatus of the first embodiment of the present invention.

FIG. 3 is a circuit diagram showing the integration circuit 220, in which the variable capacitor section 222 is illustrated particularly in detail. It should be noted that in FIG. 3, the integration circuit provided with an analog/digital converting function having a resolution of $½^3=⅛$ and this embodiment will be hereinafter described using this integration circuit.

As shown in FIG. 3, the variable capacitor section 222 comprises (i) capacitor elements C1 to C4, each having a first terminal connected to the input terminal of the charge amplifier 221 for receiving the output signal from the vertical light receiving section $110_j$; (ii) switching elements SW11 to SW14, each having a first terminal connected to a second terminal of corresponding one of the capacitor elements C1 to C4 and a second terminal connected to the output terminal of the charge amplifier 221, and each performing a switching operation according to values of the corresponding signals $C_{11}$ to $C_{14}$ of the capacitance instruction signal C; and (iii) switching elements SW21 to SW24, each having a first terminal connected to a second terminal of corresponding one of the capacitor elements C1 to C4 and the other terminal connected to the GND level, and each performing a switching operation according to values of the corresponding signals $C_{21}$ to $C_{24}$ of the capacitance instruction signal C. It should be noted that the capacitance values $C_1$ to $C_4$ of the capacitor elements C1 to C4 satisfy the following relationship.

$$C_1=2C_2=4C_3=8C_4 \qquad (2)$$

$$C_1+C_2+C_3+C_4=C_0 \qquad (3)$$

Horizontal reading-out section 250 comprises (i) a read-only memory device (ROM) 251 for receiving the digital signal D1 output from the capacitance control section 240 at its address input terminal to perform a data conversion based on data written to its memory section and for outputting the digital signal D2 from its data output terminal; and (ii) a switching element 252 for receiving the digital signal D2 from the ROM 251 at its one terminal and for switching from its ON state to OFF state and vice versa in response to the instructions of the horizontal scanning signal $H_j$.

The timing control unit 300 comprises, a basic timing section 310 for generating a basic timing signal; a vertical shift-register 320 for generating a vertical scanning signal $V_i$ according to the vertical scanning instruction informed from the basic timing section 310; a horizontal shift-register 330 for generating the horizontal scanning signal $H_j$ according to the horizontal scanning instruction informed from the basic timing section 310; and a control signal section 340 for generating the reset instruction signal R according to the basic timing informed from the basic timing section 310.

The solid-state imaging apparatus of this embodiment of the present invention collects optical image data supplied to the light receiving unit 100 as in the following manner. FIGS. 4 to 7 show drawings for explaining operations of the solid-state imaging apparatus of this embodiment of the present invention.

In the solid-state imaging apparatus of this embodiment, first, the reset instruction signal R is rendered to be set at logical one, thereby rendering all of the switching elements SW11 to SW14 to be ON state and all of the switching elements SW21 to SW24 to be OFF state. Thus, the capacitance value between the input and output terminals of the charge amplifier 221 is set to be $C_0$. At the same time, the vertical scanning signal Vi is set so as not to select all of the light receiving devices $120_{i,j}$, that is, all of the switching elements 140 are set to be OFF state. In this situation, though the reset signal R is set to be logical zero, each integration circuit 220 starts to perform the integration operation.

Next, the vertical scanning signal $V_1$ is output which renders only the switching element 140 of the first light receiving device $120_{i,j}$, on the vertical scanning for each vertical light receiving section $110_j$. When the switching element 140 is rendered to be ON state, the charges stored in the photoelectric conversion element 130 by the light receiving until that time are provided from the light receiving unit 100 as the current signal. Then, the charges Q flows into the variable capacitor section 222 set at the capacitance value $C_0$ that is the initial value (see FIG. 4).

Figure 5:
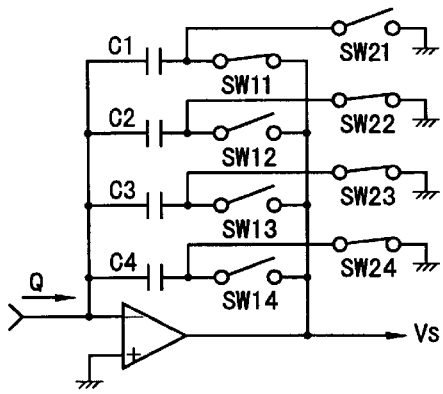
Figure 6:
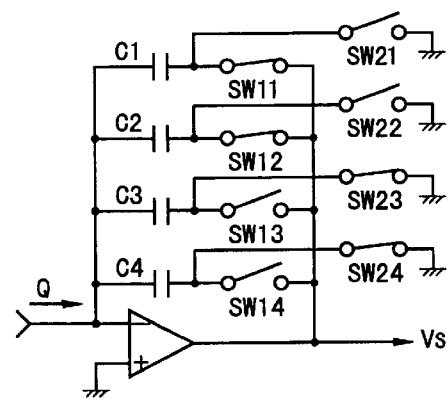

Subsequently, the capacitance control section 240 opens the switching elements SW12 to SW13 and then closes the switching elements SW22 to SW24 (see FIG. 5 ). As a result, the integration signal $V_S$ outputs the voltage value which is expressed by the equality $V_S=Q/C$. This voltage value is supplied to the comparing circuit 230 to be compared with the reference voltage $V_{REF}$.

When $V_S$ is higher than $V_{REF}$, the capacitance control section 240 opens the switching element SW22 upon receipt the comparison result from the comparing circuit 230. Thereafter, the capacitance control section 240 closes the switching element SW12 (see FIG. 6). As a result, the integration signal $V_S$ outputs the voltage value expressed by $$V_S = Q/(C_1+C_2).$$

This voltage value is supplied to the comparing circuit 230 to be compared with the reference voltage $V_{REF}$.

Figure 7:
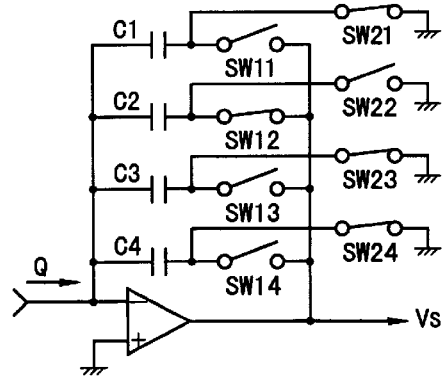

Moreover, when $V_S$ is lower than $V_{REF}$, the capacitance control section 240 opens the switching elements SW11 and SW22 upon receipt of the comparing result from the comparing circuit 230, and then closes the switching elements SW12 and SW21 (see FIG. 7). As a result, the integration signal Vs outputs the voltage value expresses by $V_S=Q/C_2$. This voltage value is supplied to the comparing circuit 230 to be compared with the reference voltage $V_{REF}$.

Afterward, in the similar manner, the comparison and the capacitance setting, that is, the ON/OFF controls for the switching elements SW11 to SW14 and SW21 to SW24, are sequentially performed by the feedback loop composed of the integration circuit 220, the comparing circuit 230, the capacitance control section 240, and the integration circuit 220, so that the capacitance values of the capacitance elements C1 to C4 are controlled. When the capacitance controls are completed for all of the capacitance elements C1 to C4, the capacitance control section 240 outputs the digital signal D1 to the horizontal reading-out section 250, the digital signal D1 being in accordance with the final capacitance setting.

In the horizontal reading-out section 250, the digital signal D1 is supplied to the address input terminal of the ROM 251, data conversion is performed based on data written to the memory section of the ROM 251, and the digital signal D2 is output from the data output terminal of the ROM 251. Subsequently, by setting the horizontal scanning signal $H_j$, the output of each ROM 251 is sequentially selected so that the detection signal according to the charges in the selected first light receiving device $120_{1,j}$, by the vertical scanning, of each vertical light receiving section $110_j$.

As a result, since the digital signal D2 is output from the switching element 252, voltage dividing by means of the capacitance of the video signal wiring 400 removes the influence as in case of an analog signal. Moreover, an analog-to-digital converter which has been needed externally to be provided is unnecessary.

It is should be noted that the vertical scanning signal $V_I$ is set such that the light receiving device is not selected at the time when the photoelectric conversion element of the light receiving device first selected in the vertical scanning completes discharging of the charges stored therein.

When the sequential reading-out from the light receiving device $120_{1,j}$ of the vertical light receiving section $110_j$ is completed, the light receiving device $120_{1,j}$ being first selected in the vertical scanning, the reset instruction signal R is rendered to be logical one.

Next, the reset instruction signal R is rendered to be logical zero again and the capacitance value of the variable capacitor section 222 is set to be the initial value $C_0$. Thereafter, the vertical scanning signal $V_2$ is output from the vertical shift-register 320 of the timing control unit 300, which renders only the switching element 140 of the light receiving device 1202 of each vertical light receiving section $110_j$ to be ON state, the switching element 140 of the light receiving device $120_{2,j}$ being secondly selected in the vertical scanning. When the switching element 140 is rendered to ON state, the charges stored in the photoelectric conversion element 130 by received light until the switching element 140 is rendered to ON state is output from the light receiving device as the current signal.

Afterward, the detection signal in accordance with the charges of the light receiving device $120_{2,j}$, secondly selected in the vertical scanning, of the vertical light receiving section $110_j$ is sequentially read out, in the similar manner to the case of the light receiving device $120_{1,j}$ first selected in the vertical scanning, of the vertical light receiving section $110_j$.

Subsequently, while sequentially designating the light receiving device $120_{i,j}$ of each vertical light receiving section $110_j$, the detection signal according to the charges in the light receiving device $120_{i,j}$ of each vertical light receiving section $110_j$ is sequentially read out, in the same manner as the case of the light receiving device $120_{1,j}$ of each vertical light receiving section $110_j$, which is first selected in the vertical scanning. Thus, the image data of the optical image supplied to the light receiving unit is collected.

(Second Embodiment)

The solid-state imaging apparatus of the second embodiment of the present invention comprises an integration circuit 220 having a different constitution from that of the imaging apparatus of the first embodiment. In the imaging apparatus of this embodiment, a high S/N is secured when charges stored in the photoelectric conversion element 130 is extremely a little.

Figure 8:
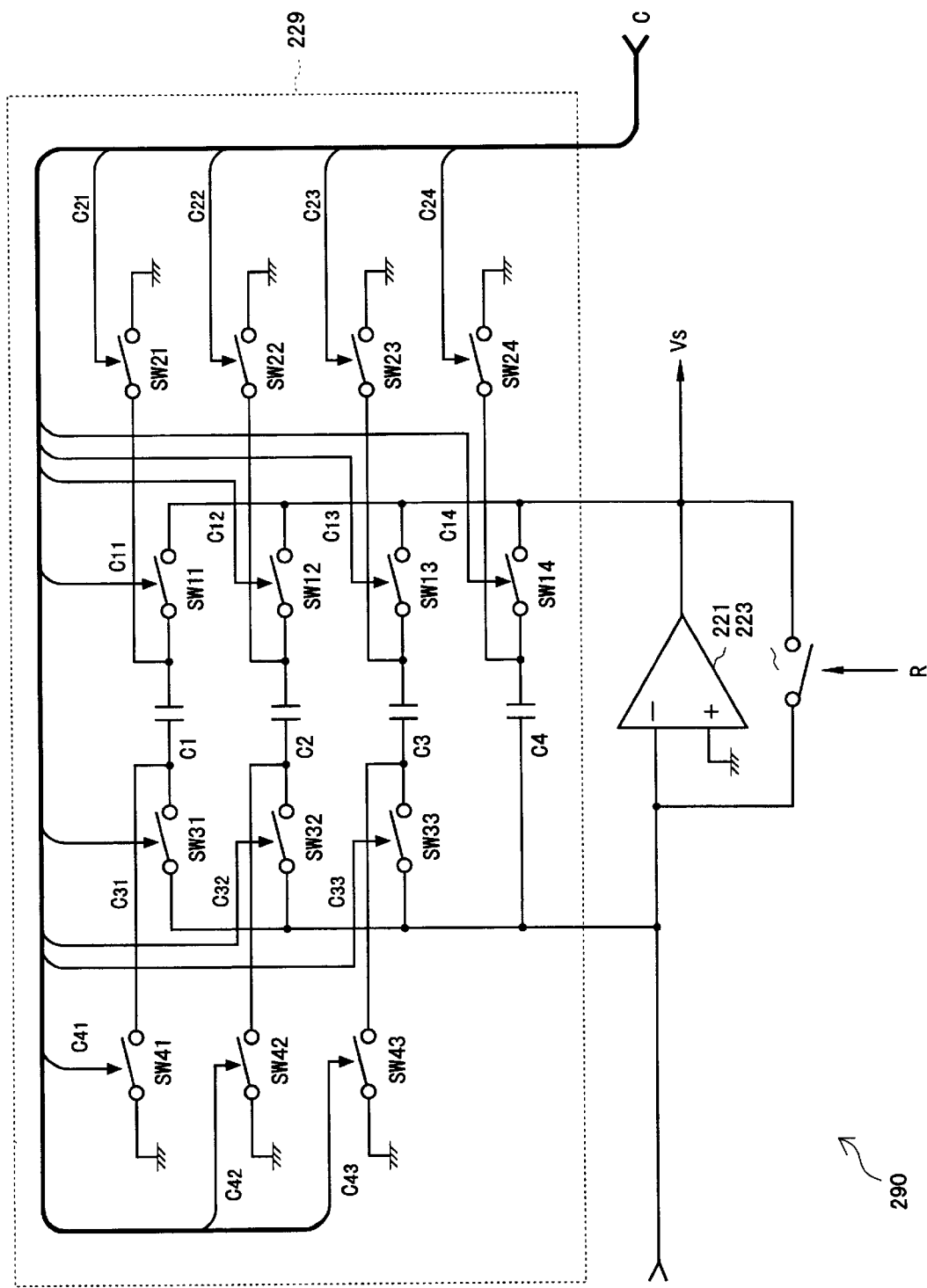
FIG. 8 is a circuit diagram showing an integration circuit of a solid-state imaging apparatus of a second embodiment of the present invention.

FIG. 8 is a circuit diagram showing the integration circuit 290. Referring to FIG. 8, the integration circuit 290 comprises (i) a charge amplifier 221 for receiving an output signal from a vertical light receiving section 110 to amplify charges of the current signal supplied therefrom; (ii) a variable capacitor section 229 having one terminal connected to an input terminal of the charge amplifier 221 and the other terminal connected to an output terminal thereof; and (iii) a switching element 223 having one terminal connected to the input terminal of the charge amplifier 221 and having the other terminal connected to the output terminal thereof, the switching element 223 being rendered to be ON state when a reset instruction signal R is logical one and being rendered to be OFF state when it is logical zero.

The variable capacitor section 229 further comprises, in addition to the variable capacitor section 222, (i) switching elements SW31 to SW33, each of first terminals of which is connected to corresponding one of terminals of capacitance elements C1 to C3 connected to the input terminal of the charge amplifier 221, and each of second terminals of which is connected to the input terminal of the charge amplifier 221 for receiving the output signal from the vertical light receiving section $110_j$; and (ii) switching elements SW41 to SW43, each of first terminals of which is connected to corresponding one of the capacitance elements C1 to C3 connected to the input terminal of the charge amplifier 221, and each of second terminals of which is in common connected to a GND level. From the capacitance control section 240, signals C31 to C33, and C41 to C43 are further supplied to the switching elements SW31 to SW33, and SW41 to SW43, which serve to control the ON/OFF operations of these switching elements.

The imaging apparatus of this embodiment collects the optical data supplied to the light receiving unit in the following manner.

In the solid-state imaging apparatus of this embodiment, first, the reset instruction signal R is rendered to be logical one, and the switching elements SW21 to SW24, and SW41 to SW43 are collectively rendered to ON state. At the same time, the switching elements SW21 to SW24, and SW31 and SW33 are collectively rendered to be OFF state. Thus, the charge value between the input and output terminals of the charge amplifier 221 is set to equal to $C_4$, and the vertical scanning signal $V_i$ is set such that the any light receiving device $120_{i,j}$, is not selected, that is, all of the switching elements 140 of the light receiving unit 100 are rendered to be OFF state. In such situation, the reset instruction signal R is set to be logical zero so that each integration circuit 220 starts to perform the integration operation.

Next, the vertical scanning signal $V_1$ is output which renders only the switching element 140 of the light receiving device $120_{1,j}$, first selected in the vertical scanning, of each vertical light receiving section $110_j$. When the switching element 140 is rendered to be ON state, the charges hat have been stored in the photoelectric conversion element 130 by the light receiving are output from the light receiving unit 100 as the current signal. Then, the charges Q flow into the variable capacitor section 229 set at the capacitance value $C_4$ of the initial value.

At this time, the integration signal $V_S$ outputs the voltage value expressed by $$V_S = Q/C.$$

Next, after the switching elements SW41 to SW43 are rendered to be OFF state, the switching elements SW31 to SW33 are rendered to be ON state. Since the voltage relationship across both terminal of the capacitance elements C1 to C3 makes no change though the switching elements SW41 to SW43, and SW31 to SW33 are switched described above, the value of the integration signal $V_S$ is not varied. Thus, total quantity of the charges generated in the capacitance elements C1 to C4 becomes $$Q' = Q \cdot (C_0/C_4).$$

Specifically, the charges of $(C_0/C_4)$ times that in the first embodiment will be stored.

Afterward, similar to the first embodiment, the optical image data supplied to the light receiving unit 100 is collected. Consequently, the S/N can be secured when the charges stored in the photoelectric conversion element 130 are extremely a little.

(Third Embodiment)

Figure 9:
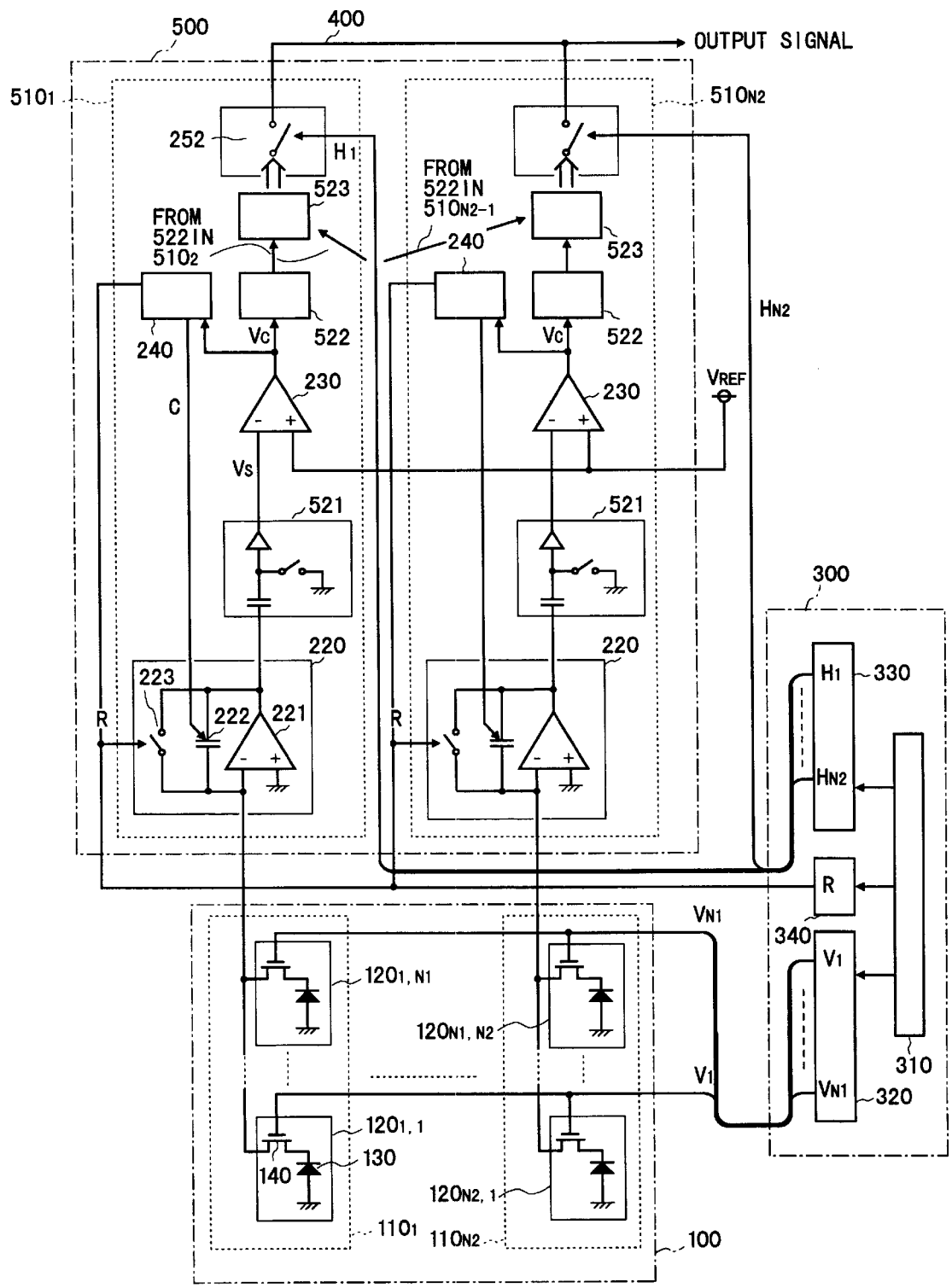
FIG. 9 is a circuit diagram showing a solid-state imaging apparatus of a third embodiment of the present invention.

FIG. 9 is a circuit diagram of a solid-state imaging apparatus of the third embodiment of the present invention. Referring to FIG. 9, the imaging apparatus of the third embodiment comprises, (a) a light receiving unit 100 composed of an N2 number of vertical light receiving sections 110 arranged along a first direction (hereinafter referred to as a horizontal direction), each of which consists of N1 species of light receiving devices 120 arranged in a second direction (hereinafter referred to as a vertical direction), each light receiving device being composed of a photoelectric conversion element 130 for converting a input optical signal to a current signal and a switching element 140 connected to the signal output terminal of the photoelectric conversion element 130 to provide the current signal generated by the photoelectric conversion element 130 in response to a vertical scanning signal $V_i$(i=1 to N1), the signal output terminal of each switching element 140 being electrically connected to one another; (b) a signal processing unit 500 having horizontal signal processing sections $510_j$, each of which receives an output signal from corresponding one of the vertical light receiving sections $110_j$(j=1 to N2) to output the signal after processing it alternatively in response to a horizontal scanning signal $H_j$; and (c) a timing control unit 300 for informing instruction signals on operation timings to the receiving unit 100 and the signal processing unit 200.

Each of the horizontal signal processing sections $510_j$ comprises (i) a integration circuit 220 which receives the output signal from the vertical light receiving section $110_j$ and enables variable capacitance section 222 either to integrate the output signal as a current signal when a reset instruction signal R is in logical zero or to integrate no output signal when it is in logical one, the variable capacitor section 222 being connected between the input and output terminals thereof; (ii) a clamp circuit for removing noises superposed on a signal $V_S$ output from the integration circuit 220; (iii) a comparing circuit 230 which compares each integration signal $V_S$ provided from the clamp circuit 521 with the reference value $V_{REF}$ to output the comparing result; (iv) a capacitance control section 240 which receives a comparing result signal $V_C$ of one bit two level signal from the comparing circuit 230 and outputs a capacitance instruction signal C for informing to the variable capacitor section 222 according to the value of the comparing result signal $V_C$; (v) a FILO register 522 which receives sequentially the comparing result $V_C$ as serial digital data output from the comparing circuit 230 to output serial digital data in the opposite order to that of the input order; (vi) a processing unit 523 which receives sequentially the serial digital data from the FILO register 522 in the same horizontal signal processing section $510_j$ and the serial digital data from the FILO register 522 in the adjacent horizontal signal processing section $510_{j'}$, and performs paralleling after computation to output a first parallel digital signal; and (vii) a horizontal reading-out switch 252 which receives the parallel digital signal from the processing unit 523 to output a digital signal according in response to the horizontal scanning signal $H_j$.

The imaging apparatus of this embodiment collects the optical image supplied to the light receiving unit 100, in the following manner.

In the solid-state imaging apparatus of this embodiment of the present invention, similar to the first embodiment, the reset instruction signal R is rendered to be logical one, and the switching elements SW11 to SW14 are collectively rendered to be ON state. At the same time, the switching elements SW21 to SW24 are collectively rendered to be OFF state. Thus, the capacitance value between the input and output terminals of the charge amplifier 221 is set to be $C_0$, and the vertical scanning signal $V_i$ is set so that any light receiving device $120_{i,j}$ is not selected, that is, all switching elements 140 are rendered to be OFF state. In this situation, the reset instruction signal R is set to be logical zero so that each integration circuit 220 starts to perform the integration operation.

Next, similar to the first embodiment, the vertical scanning signal $V_1$ is output which renders only the switching element 140 of the light receiving device $120_{1,j}$, first selected in the vertical scanning, of each vertical light receiving section $110_j$. When the switching element 140 is rendered to be ON state, the charges which have been stored in the photoelectric conversion element 130 by light receiving are output from the light receiving unit 100 as the current signal. Then, the charges Q flow into the variable capacitor section 222 which is set to be capacitance value $C_0$ that is an initial value.

Subsequently, similar to the case of the first embodiment, the capacitance control section 240 open the switching elements SW12 to SW13 and then close the switching elements SW22 to SW24. As a result, the integration signal Vs outputs the voltage value expressed by $$V_S = Q/C_1.$$

This voltage value is input to the comparing circuit 230 to be compared with the reference voltage $V_{REF}$.

When $V_S$ is higher than $V_{REF}$, the capacitance section 240 further opens the switching element SW22 upon receipt of the comparing result, and then closes the switching element SW12. As a result, the integration signal $V_S$ output the voltage value $V_S$ expressed by $$V_S = Q/(C_1 + C_2).$$

This voltage value is input to the comparing circuit 230 to be compared with the reference voltage $V_{REF}$.

Furthermore, when $V_S$ is lower than $V_{REF}$, the capacitance control section 240 further opens the switching elements SW11 and SW22 upon receipt of the this comparing result, and then closes the switching elements SW12 and SW21. As a result, the integration signal $V_S$ outputs the voltage value expressed by $$V_S = Q/C_2.$$

This voltage value is input to the comparing circuit 230 to be compared with the $V_{REF}$. Subsequently, every time when the capacitance value of the variable capacitor section 222 varies, serial digital data is sequentially to the FILO register 522 from the comparing circuit 230 from most significant bit toward least significant bit and stored therein.

Afterward, similar to the case of the first embodiment, the a feedback loop is constituted by the chain of the integration circuit 220, the comparing circuit 230, and the capacitance control section 240. The comparison and the capacitance setting are sequentially repeated by this feedback loop, that is, the switching elements SW11 to SW14, and SW21 to SW24 are controlled so as to perform ON/OFF operations. Thus, the capacitance controls as to the capacitance element from the capacitance element C1 to the capacitance element C4 are performed. When the capacitance controls as to the capacitance elements C1 to C4 are completed, the comparing circuit 230 finishes to output the serial digital data from the most significant bit to the least significant bit, and the FILO register 522 completes to receive the serial digital data for one pixel for the horizontal signal processing section including this FILO register 522.

The processing unit 523 receives the serial digital data from that FILO register 522 in the order of the least significant bit to the most significant bit and the processing unit 523 receives the serial digital data from the FILO register 522 in the adjacent horizontal signal processing section, in the order of the least significant bit to the most significant bit. Then, after the contour extraction computation, the computation result is output to the horizontal reading-out switch 252 as a parallel digital data signal.

In the horizontal reading-out section, the parallel digital data signal provided from the processing unit 523 is input and the detection signal in response to the light receiving device $120_{1,j}$, first selected in the vertical scanning, of each vertical light receiving section $110_j$ is sequentially output based on the horizontal scanning signal $H_j$.

As a result, since the digital signal is output from the horizontal reading-out switch 252, the imaging apparatus of this embodiment is not influenced by the voltage dividing due to the parasitic capacitance of the video signal wiring 400. In addition, an external analog-to-digital converter which has been needed will not necessary.

It should be noted that the vertical scanning signal $V_1$ is set such that it does not select the light receiving device at the time when the charges stored in the photoelectric conversion element of the light receiving device first selected in the vertical scanning are discharged perfectly.

When the reading-out operations of the detection signal sequentially performed in accordance with the charge in the light receiving device $120_{1,j}$, first selected in the vertical scanning, of the vertical light receiving section 110 are completed, the reset instruction signal R is rendered to be logical one.

Next, the reset instruction signal R is rendered again to be logical zero and the capacitance value of the variable capacitor section 222 is rendered to be the initial value $C_0$. Thereafter, the vertical scanning signal $V_2$ is output, which renders only the switching element 140 of the light receiving device $120_{2,j}$, secondly selected in the vertical scanning, of each vertical light receiving section $110_j$. When the switching element 140 is rendered to be ON state, the charges which has been stored in the photoelectric conversion element 130 by light receiving are output as the current signal.

Afterward, similar to the case of the light receiving device $120_{1,j}$, first selected in the vertical scanning, of the vertical light receiving section $110_j$, the detection signals are sequentially read out, which are in accordance with the charges in the light receiving device $120_{2,j}$ secondly selected in the vertical scanning, of the vertical light receiving section $110_j$.

Subsequently, while sequentially designating the light receiving device $120_{i,j}$, of each vertical light receiving section $110_j$, the detection signal in accordance with the charges in the light receiving device $120_{i,j}$, of each vertical light receiving section $110_j$ is sequentially read out, in the same manner as that in the light receiving device $120_{1,j}$, first selected in the vertical scanning, of each vertical light receiving section $110_j$. Thus, the image data input to the light receiving device is collected.

It should be noted that also in the third embodiment, the similar modification to the second embodiment will be possible, adopted in the first embodiment.

Although the preferred embodiments of the present invention has been described in detail, the present invention is not limited thereto, and various changes, substitution and alternations can be made therein without departing from spirit and scope of the inventions as defined by the appended claims. For example, in the first embodiment, it will be possible to adopt a simple circuit constitution by constituting the horizontal reading-out section only with the switching element 252. However, when the horizontal reading-out section has such constitution, since compensation for the offset value for every horizontal signal processing section is impossible, deterioration in measurement accuracy is expected than in the foregoing embodiments.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No.136839/1995 filed on Jun. 2, 1995 and No.318611/1995 filed on Nov. 13, 1995 are hereby incorporated by reference.

What is claimed is:

1. A solid-state imaging apparatus for imaging a two-dimensional optical image comprising:

a light receiving unit including a first number of vertical light receiving sections arranged along a first direction, each of the vertical light receiving sections including a second number of light receiving devices arranged in a second direction, each of the light receiving device being composed of a photoelectric conversion element for converting an input optical signal to a current signal and a switching element, the switching element having a first terminal connected to a signal output terminal of the photoelectric conversion element and a second terminal to output the current signal generated by the photoelectric conversion element in response to a vertical scanning signal, and each of said vertical light receiving sections having a signal output terminal electrically connected to the second terminal of said switching element;

a first number of integration circuits for receiving individually an output signal from the corresponding vertical light receiving section, each of the integration circuits enabling, in response to a reset instruction signal, a variable capacitor section either to perform an integration for the current signal output from corresponding vertical light receiving section or not to perform the integration for the current signal, said variable capacitor section being connected between input and output terminals of a charge amplifier, and the variable capacitor section varying a capacitance value in response to a capacitance instruction signal;

the first number of comparing circuits for comparing an integration signal output from the corresponding integration circuit with a reference value to output a comparing result;

the first number of capacitance control sections, each receiving a comparing result signal from the corresponding comparing circuit and for outputting a capacitance instruction signal for informing a capacitance variation value to said variable capacitor section in accordance with a value of the comparing result signal, and outputting a first digital signal in response to said capacitance instruction signal when it is judged from said comparing result signal that a value of the integration signal agrees with said reference value at a predetermined resolution; and the first number of horizontal reading-out sections, each receiving said first digital signal from the corresponding capacitance control section, and outputting a second digital signal in response to a horizontal scanning signal.

2. The imaging apparatus according to claim 1, wherein values of the first and second digital signals are equal each other.

3. The imaging apparatus according to claim 1, wherein said horizontal reading-out section further comprises a data conversion section for receiving said first digital signal output from said capacitance control section and for outputting said second digital signal after data conversion.

4. The imaging apparatus according to claim 3, wherein said data conversion section has an offset cancel.

5. The imaging apparatus according to claim 3, wherein said data conversion section comprises a read-only memory device for receiving said first digital signal at an address input terminal thereof, performing data conversion based on data written to a memory section thereof, and outputting said second digital signal from a data output terminal thereof.

6. The imaging apparatus according to claims 1, wherein said variable capacitor section comprises:
a third number of capacitance elements;

the third number of first switching elements, each of the first switching elements having a first terminal connected to a first terminal of corresponding one of the capacitance elements and having a second terminal connected to the output terminal of said charge amplifiers, and each first switching element opening/closing in response to said capacitance instruction signal; and the third number of second switching elements, each of the second switching elements having a first terminal connected to a second terminal of corresponding one of the capacitance elements and having a second terminal connected to a reference potential level terminal, and each second switching element opening/closing in response to a value of the capacitance instruction signal.

7. The imaging apparatus according to claim 6, wherein a resolution is equal to $\frac{1}{2}^{(\text{the third number}-1)}$ of said reference value, and each of the third number of the capacitance elements has a capacitance value satisfying a relationship expressed by an equation $$C_1 = 2C_2 = 2^{N-1}C_N$$

where N is the third number.

8. A solid-state imaging apparatus for imaging a two-dimensional optical image comprising:

a light receiving unit including a first number of vertical light receiving sections arranged along a first direction, each of the vertical light receiving sections including a second number of light receiving devices arranged in a second direction, each light receiving device being composed of a photoelectric conversion element for converting an input optical signal to a current signal and a switching element, the switching element having a first terminal connected to a signal output terminal of said photoelectric conversion element and a second terminal to output the current signal generated by said photoelectric conversion element in response to a vertical scanning signal, and each of said vertical light receiving sections having a signal output terminal electrically connected to a second terminal of said switching element;

a first number of integration circuits for receiving individually the output signal from the corresponding vertical light receiving section, each of the integration circuits enabling, in response to a reset instruction signal, a variable capacitor section either to perform an integration for the current signal output from corresponding vertical light receiving section or not to perform the integration for the current signal, said variable capacitor section being connected between input and output terminals of a charge amplifier, and the variable capacitor section varying a capacitance value in response to a capacitance instruction signal;

the first number of comparing circuits, each comparing the value of the integration signal from corresponding one of said integration circuits with a reference value every time when a capacitance value of the variable capacitor section of corresponding one of said integration circuits varies and outputting a comparing result as a first serial digital data;

the first of capacitance control sections, each receiving a comparing result signal from corresponding one of said comparing circuits, and outputting a capacitance instruction signal for instructing said variable capacitor section according to the value of the comparing result signal;

the first number of first-in-last-out (FILO registers, each sequentially receiving the first serial digital data from corresponding one of said comparing circuits, and outputting a second serial digital data in an reverse order to the inputting order;

the first number of processing units, each receiving sequentially said second serial digital data from corresponding one of said FILO registers, and outputting a first parallel digital signal after parallel processing; and the first number of horizontal reading-out sections, each receiving a signal from corresponding one of said processing units, and outputting the signal in response to a horizontal scanning signal.

9. The imaging apparatus according to claim 8, wherein said processing unit further receives said second serial digital data from a FILO register arranged in an adjacent vertical light receiving section, and performs computations for adjacent pixels to output a second parallel digital data to said horizontal reading-out section.

10. The imaging apparatus according to claims 8, wherein said variable capacitor section comprises:

a third number of capacitance elements;

the third number of first switching elements, each of the first switching elements having a first terminal connected to a first terminal of corresponding one of the capacitance elements and having a second terminal connected to the output terminal of said charge amplifiers, each of the first switching elements opening/closing in response to said capacitance instruction signal; and the third number of second switching elements, each of the second switching elements having a first terminal connected to a second terminal of corresponding one of the capacitance elements and having a second terminal connected to a reference potential level terminal, each of the second switching elements opening/closing in response to a value of the capacitance instruction signal.

11. The imaging apparatus according to claim 10, wherein a resolution is equal to $\frac{1}{2}^{(\text{the third number}-1)}$ of said reference value, and each of the third number of the capacitance elements has a capacitance value satisfying a relationship expressed by an equation $$C_1 = 2C_2 = \ldots 2^{N-1} C_N$$

where N is the third number.

* * * * *